US 6,698,220 B2

(12) United States Patent
Yoneno et al.

(10) Patent No.: US 6,698,220 B2
(45) Date of Patent: Mar. 2, 2004

(54) AUTOMOTIVE AIR CONDITIONING SYSTEM (75) Inventors: Tsuyoshi Yoneno, Anjo (JP); Atsushi Hasegawa, Kariya (JP); Yukihiro Hirose, Kariya (JP); Hiroshi Kamiya, Gamagori (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/374,195

(22) Filed: Feb. 26, 2003

(65) Prior Publication Data
US 2003/0159450 A1 Aug. 28, 2003

(30) Foreign Application Priority Data

Feb. 28, 2002 (JP) ........................ 2002-053647
Oct. 1, 2002 (JP) ........................ 2002-288300

(51) Int. Cl.$^7$ ............................................ F25B 39/04
(52) U.S. Cl. ................................. 62/184; 62/244
(58) Field of Search ................ 62/181, 183, 184, 62/259.1, 244, 414, 419, 450, 507, DIG. 16, 428; 165/53

(56) References Cited

U.S. PATENT DOCUMENTS

| 4,134,275 A | | 1/1979 | Erickson et al. | |
|---|---|---|---|---|
| 4,217,764 A | * | 8/1980 | Armbruster | ................ 62/323.1 |
| 4,679,616 A | * | 7/1987 | Ferdows et al. | ............... 165/43 |
| 4,732,011 A | * | 3/1988 | Haiya | ........................... 62/244 |
| 4,926,655 A | * | 5/1990 | King | ............................. 62/244 |
| 5,605,055 A | * | 2/1997 | Salgado | ....................... 62/244 |
| 5,632,330 A | * | 5/1997 | Drucker et al. | ............. 165/151 |
| 6,282,912 B1 | * | 9/2001 | Mannerheim | ................ 62/244 |
| 6,295,826 B1 | * | 10/2001 | Lee | .............................. 62/244 |

FOREIGN PATENT DOCUMENTS

| DE | 32 34 895 | | 1/1984 |
|---|---|---|---|
| DE | 33 44212 | | 9/1985 |
| DE | 44 15 129 | | 4/1995 |
| EP | 0 257 569 | | 3/1988 |
| EP | 4027682 A1 | * | 3/1992 |
| JP | 54-57735 | | 5/1979 |
| JP | 4-133813 | | 5/1992 |
| JP | 02000038028 A | * | 2/2000 |

* cited by examiner

Primary Examiner—William E. Tapolcai
Assistant Examiner—Mohammad M. Ali
(74) Attorney, Agent, or Firm—Harness, Dickey & Pierce, PLC (57) ABSTRACT In an automotive air conditioning system according to the present invention, a thin condenser 2 of a condensing unit portion 10 installed on a flat roof of a vehicle such as a bus is provided in such a manner as to be inclined downwardly from the front toward the rear of the vehicle, condenser fans 4 are provided directly above the condenser, and an air inlet 51 to the condenser is disposed in front of the condenser whereas air outlets 52 are disposed above the condenser.

10 Claims, 9 Drawing Sheets

Fig.5A
WIND VELOCITY DISTRIBUTION (m/s)
(NUMERALS DENOTE WIND VELOCITIES)
A CASE WHERE THE DISTAL END OF THE BUS IS FORMED INTO AN EDGE SHAPE

Fig.5C
WIND VELOCITY DISTRIBUTION (m/s)
(NUMERALS DENOTE WIND VELOCITIES)
A CASE WHERE THE DISTAL END OF THE BUS IS FORMED INTO AN R SHAPE

Fig.5B
TOTAL PRESSURE DISTRIBUTION (Pa)
(NUMERALS DENOTE PRESSURES)

Fig.5D
TOTAL PRESSURE DISTRIBUTION (Pa)
(NUMERALS DENOTE PRESSURES)

Fig. 6

⟨CONTROL I⟩

Fig. 7

⟨CONTROL II⟩

AUTOMOTIVE AIR CONDITIONING SYSTEM

BACKGROUND OF THE INVENTION

1. Field of the Invention

The present invention relates to an air conditioning system designed to be mounted on the roof of a vehicle such as a bus.

2. Description of the Related Art

Figure 9:
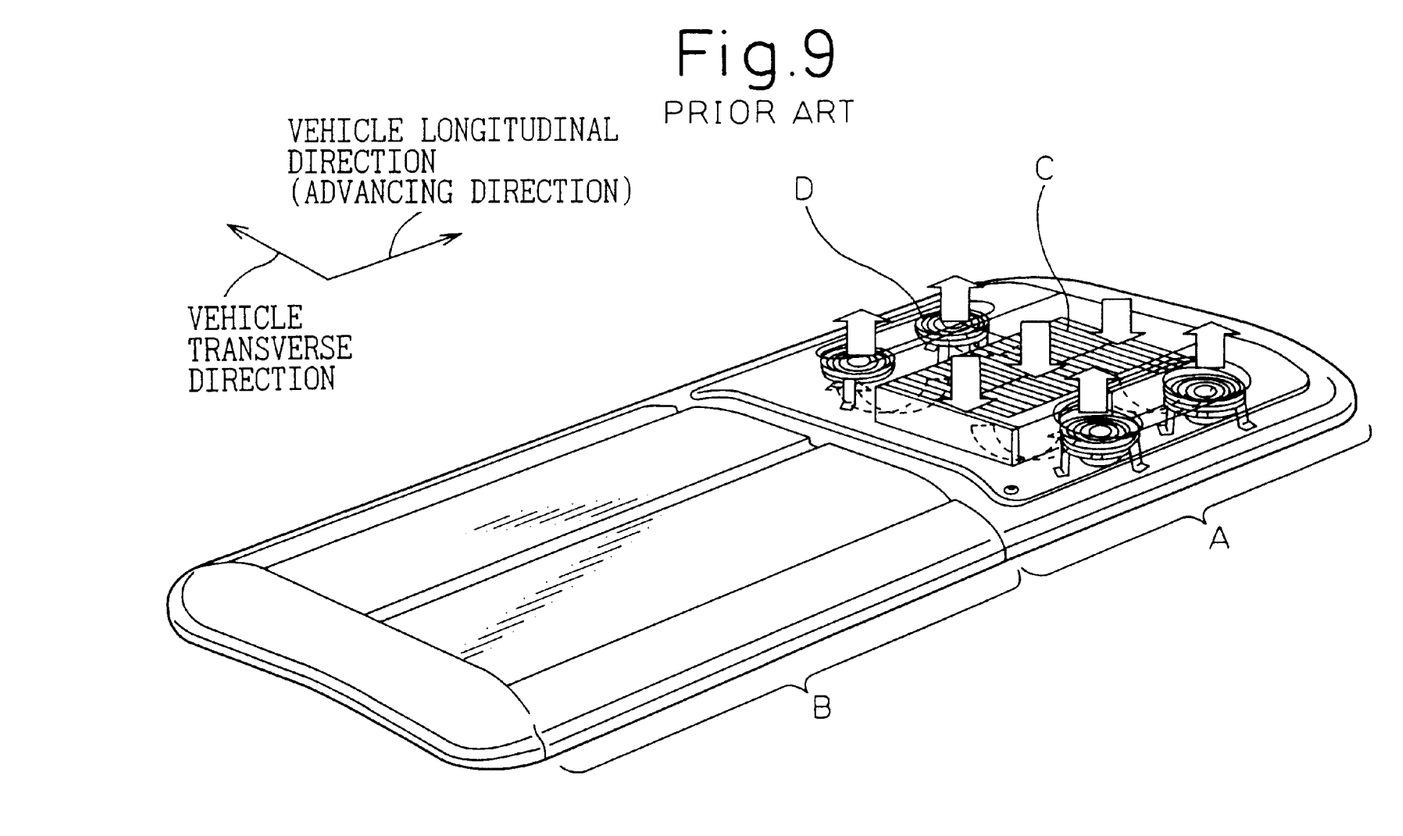
FIG. 9 is a perspective view showing the overall construction of a conventional automotive air conditioning system.
Figure 10:
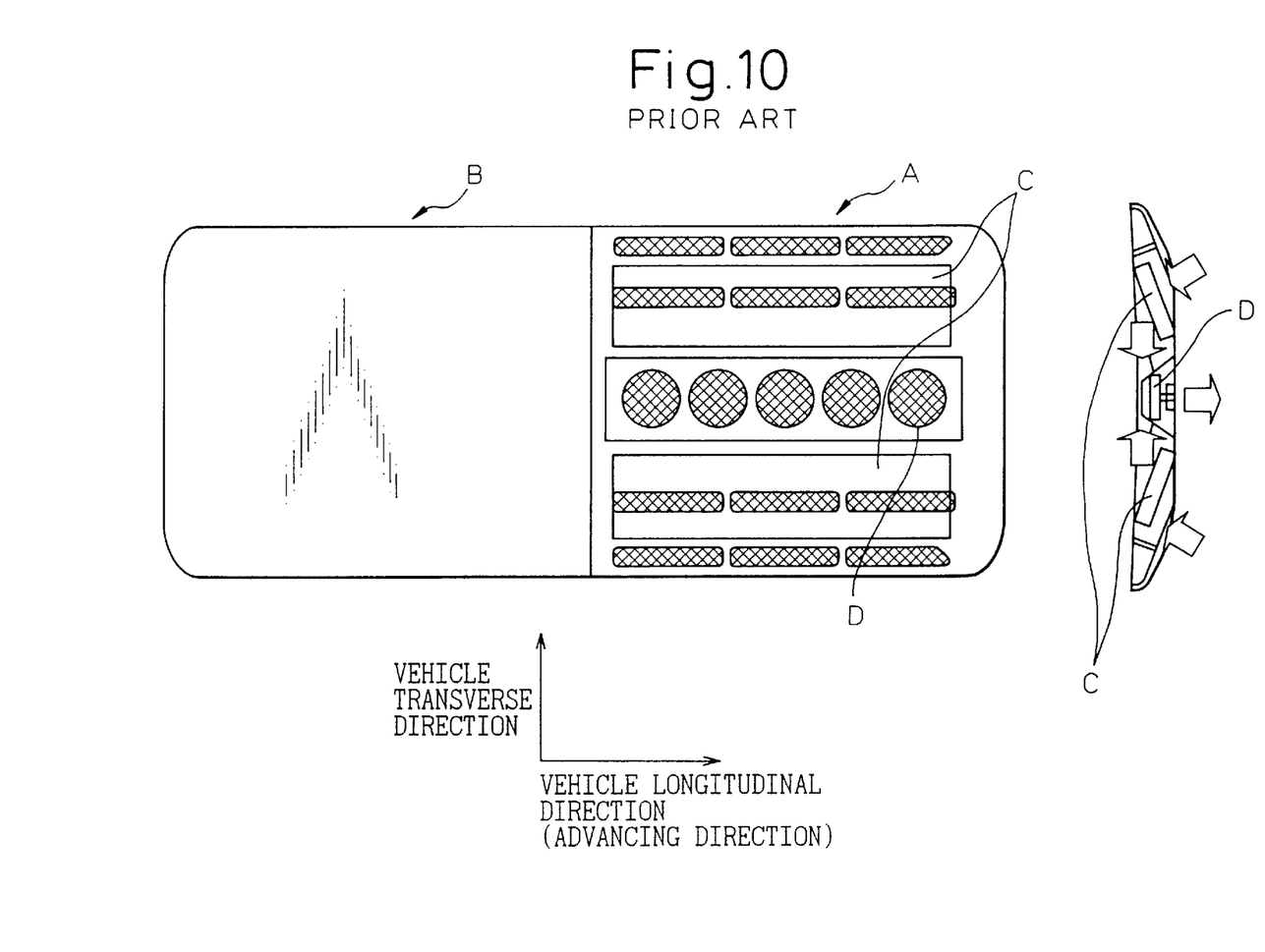
FIG. 10 shows a plan view and a sectional view of another conventional automotive air conditioning system.

In conventional air conditioning systems that are designed to be mounted on the roof of a vehicle such as a bus, a fan and a motor are placed horizontally on the roof in such a manner that they do not overlap a condenser vertically due to the restriction on the height of the vehicle. FIGS. 9 and 10 show examples of the conventional layout of the air conditioning system.

Namely, according to the layout of a condensing unit portion A of an air conditioning system shown in FIG. 9, a condenser C of a plate fin and tube type is placed on the surface of the roof of a vehicle in such a manner that air inlets and air outlets are situated horizontally, and fans and motors D are placed on both sides of the condenser. In addition, a cooling unit portion B is placed adjacent to the condensing unit portion A in a longitudinal direction of the vehicle.

Additionally, in FIG. 10, a similar plate fin and tube type condenser C is used in a condensing unit portion A of an air conditioning system, which is divided into two condenser portions in a transverse direction of the vehicle, and fans and motors D are placed centrally between the divided condenser portions with air inlets and oriented in the transverse directions of the vehicle. Similarly to the example in FIG. 9, a cooling unit portion B is placed adjacent to the condensing unit portion A in the longitudinal direction of the vehicle.

According to the layouts of the conventional air conditioning systems which are overlaid on the roof of the vehicle as shown in FIGS. 9 and 10, while the height of the units can be reduced, the longitudinal or transverse dimension thereof becomes large. In addition, the air inlets of the condensers are not oriented to the front of the vehicle, and hence a ram pressure produced while the vehicle is running cannot be utilized effectively, this causing a problem that the amount of air drawn into the condenser cannot be increased.

SUMMARY OF THE INVENTION

The present invention was made in view of the aforesaid problem, and an object thereof is to provide an automotive air conditioning system which can reduce the longitudinal dimension of a condensing unit portion so as to make the condensing unit portion compact and which can effectively utilize a ram pressure produced while the vehicle is running so as to increase the amount of air drawn into a condenser, whereby the discharge pressure of a compressor can be reduced while increasing the coefficient of performance (COP) thereof, thereby making it possible to largely reduce the load power applied to an engine of the vehicle.

In addition, according to the construction of the automotive air conditioning system of the present invention, as a cooling unit portion and the condensing unit portion are mounted on the roof of the vehicle so that running air can effectively drawn into the condensing unit portion, foreign matters are easily collected in a condenser roof and upstream of a core portion of a condenser, whereby the performance of the condenser is reduced and the pressure of a refrigeration cycle is increased, this leading to a risk that the equipment fails. Due to this, another object of the present invention is to provide an automotive air conditioning system adapted to be mounted on the roof of a vehicle in which the foreign matters, that do collect, can be removed easily.

According to an aspect of the present invention, there is provided an automotive air conditioning system wherein a condenser of a condensing unit portion is inclined in a longitudinal direction of the vehicle and a condenser fan is provided directly above the condenser, and wherein an air inlet to the condenser is disposed in front of the condenser and an air outlet from the condenser is disposed above the condenser, whereby the longitudinal dimension of the condensing unit portion can be reduced so as to make the condensing unit portion compact. In addition, the amount of air drawn into the condenser can be increased by making effective use of a ram pressure produced while the vehicle is running, whereby the discharge pressure of a compressor can be reduced and the coefficient of performance of the compressor can be increased. Thus, the load power applied to an engine of the vehicle can be largely reduced.

According to another aspect of the present invention, there is provided an automotive air conditioning system, wherein the condenser is inclined downwardly from the front toward the rear of the vehicle, whereby the increase in the amount of air drawn into the condenser can be utilized most effectively.

According to a further aspect of the present invention, there is provided an automotive air conditioning system, wherein the condenser fan is placed horizontally, whereby the height of the vehicle can be reduced.

According to an aspect of the present invention, there is provided an automotive air conditioning system, wherein a unit cover for covering the condenser and the condenser fan is opened at the front and is closed at the rear and on both sides the unit cover, whereby the amount of air drawn in can be led to the condenser effectively without wasting any of the air so drawn in.

According to another aspect of the present invention, there is provided an automotive air conditioning system wherein a position, where the condensing unit portion is disposed, is specified to be a portion of the roof of the vehicle such as a bus where the flow of air flowing along the roof while the vehicle is running becomes a laminar flow, whereby the flow of air can be drawn into the condenser effectively.

According to a further aspect of the present invention, there is provided an automotive air conditioning system, wherein the condensing unit portion is disposed rearward of the first two thirds of the overall length of a vehicle, such as a bus, in the event that an upper portion of a distal end of the vehicle is formed into an edge shape, whereby the condensing unit portion can be disposed at not an area on the roof where the flow of air becomes a turbulent flow but an area on the roof where the flow of air becomes a laminar flow, and the flow of air can be drawn in the interior of the condensing unit portion constantly and effectively.

According to an aspect of the present invention, there is provided an automotive air conditioning system wherein the inclination angle of the condenser is restricted substantially to 6 to 12 degrees, and this range of the inclination angle allows the flow of air to be drawn into the condenser effectively without increasing the height of the vehicle.

According to another aspect of the present invention, there is provided an automotive air conditioning system wherein the air inlet to the condenser is covered with a net, and wherein a notch is formed in a vehicle frame for use in mounting the automotive air conditioning system on the roof of the vehicle in the vicinity of the rear of the condenser, whereby, as large foreign matters are captured by the net whereas small foreign matters are discharged from the notch in the vehicle frame to the outside thereof by virtue of running air, the reduction in the performance of the condenser due to the collection of foreign matters therein can be prevented.

According to a further aspect of the present invention, there is provide an automotive air conditioning system further comprising a control means for a condenser fan motor, wherein the condenser fan motor is forcibly switched off every a given time by the control means, whereby foreign matters collecting in a condenser room can be discharged from the notch by reducing an amount of the running air entering the condenser that is discharged through the condenser and increasing a portion of the same running air that is discharged from the notch in the vehicle frame.

According to an aspect of the present invention, there is provided an automotive air conditioning system, further comprising a control means for a condenser fan motor, wherein the condenser fan motor is caused to turn in a reverse direction for a given time by the control means after the automotive air conditioning system has been activated, whereby the foreign matters can forcibly be discharged from the notch in the vehicle frame.

According to another aspect of the present invention, there is provided an automotive air conditioning system, further comprising a control means for a condenser fan motor and a pressure detecting means for detecting the discharge pressure of a compressor, wherein the condenser fan motor is controlled according to the discharge pressure of the compressor. Namely, when foreign matters collect and the discharge pressure increases, the condenser motor is switched off, so that the foreign matters that collect are discharged from the notch.

The present invention may be more fully understood from the description of preferred embodiments of the invention, as set forth below, together with the accompanying drawings.

DESCRIPTION OF THE PREFERRED EMBODIMENTS

Figure 1:
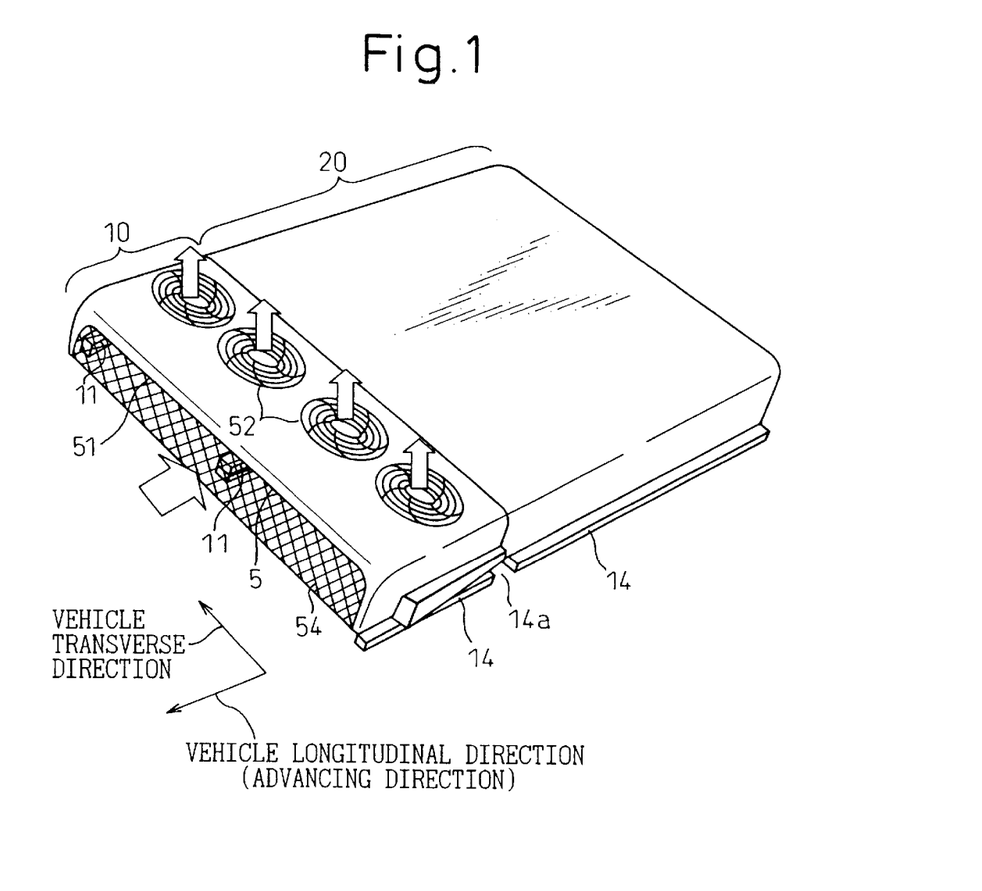
FIG. 1 is a perspective view showing the overall construction of an automotive air conditioning system according to an embodiment of the present invention.
Figure 2A:
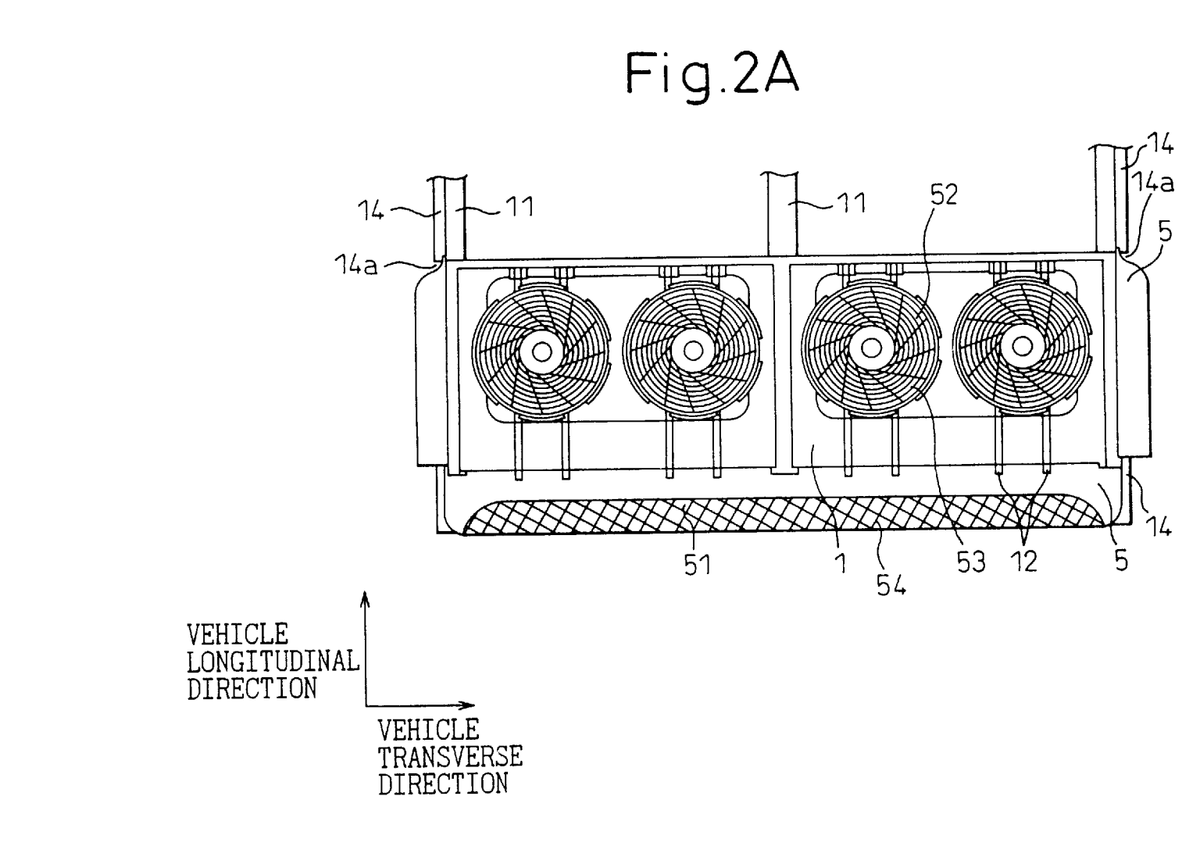
FIG. 2A is a plan view of a condensing unit portion.
Figure 2B:
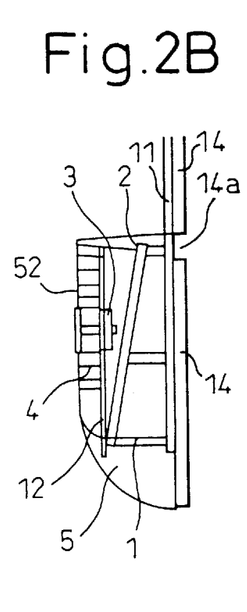
FIG. 2B is a side sectional view of the condensing unit portion.
Figure 3:
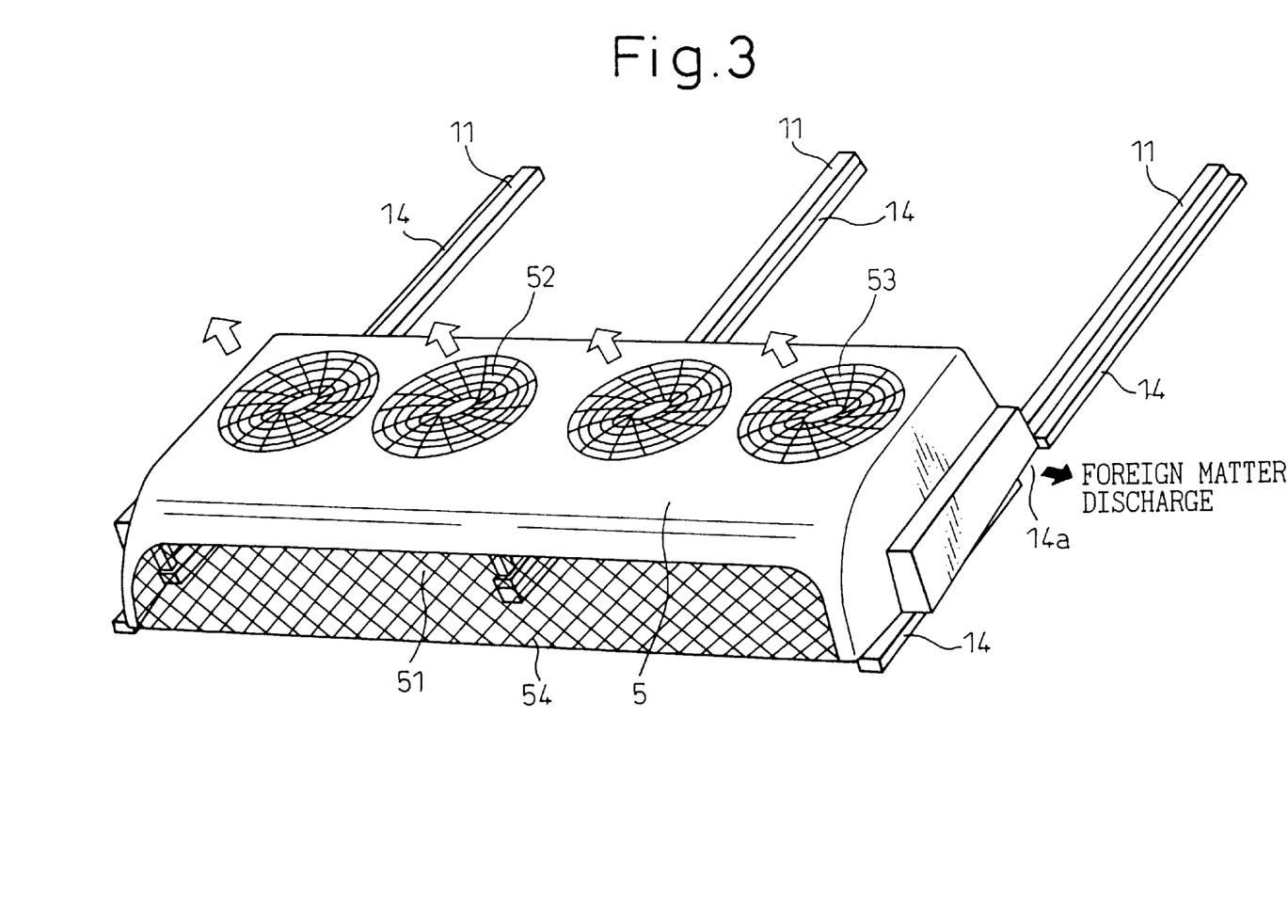
FIG. 3 is a perspective view of a unit cover for the condensing unit portion.
Figure 4:
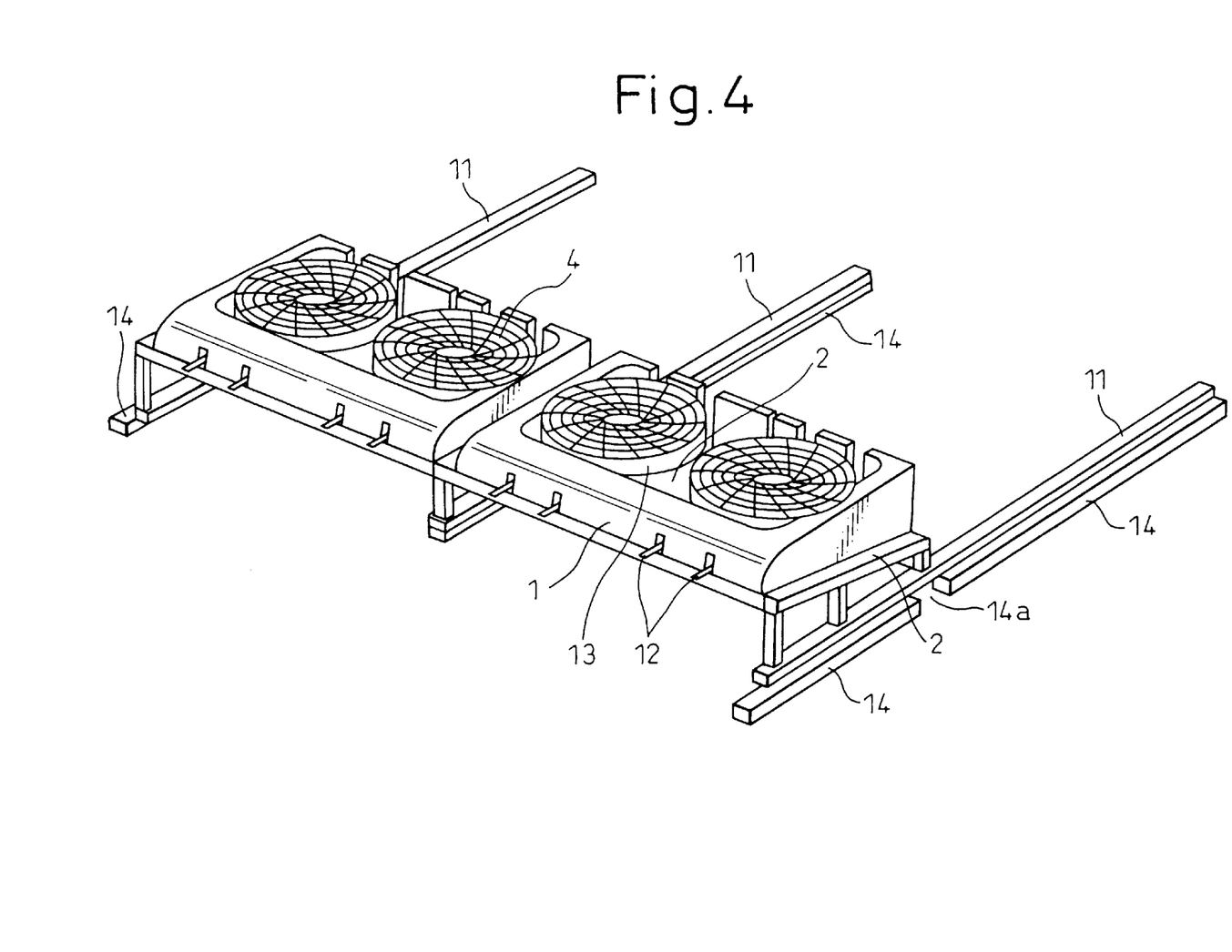
FIG. 4 is a perspective view of a unit case of the condensing unit portion.
Figure 5A:
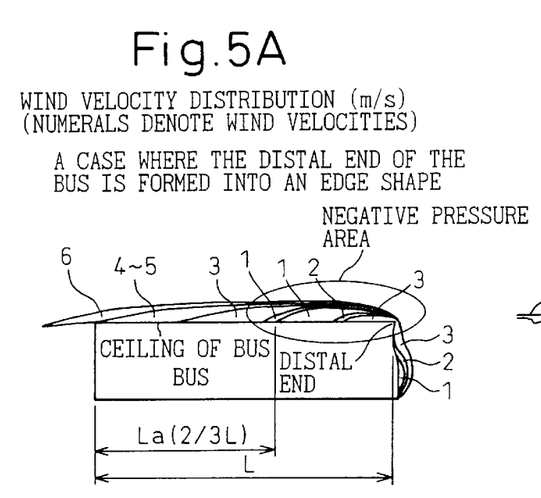
FIG. 5 shows wind velocity distributions (a), (c) and total pressure distributions (b), (d) on the roof of a bus which result from a difference in the shape of a distal end of the bus.
Figure 5B:
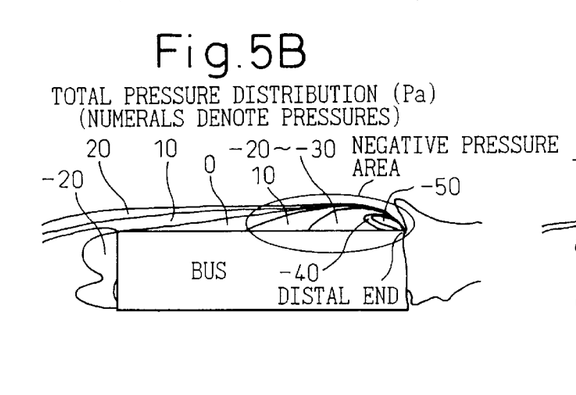
Figure 5C:
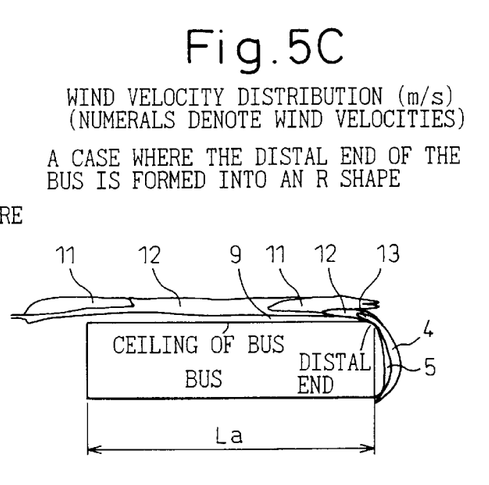
Figure 5D:
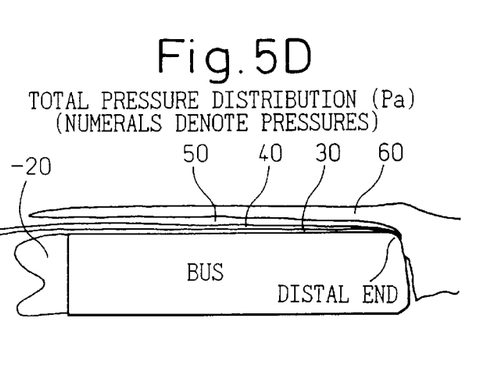

Automotive air conditioning systems according to embodiments of the present invention will be described below with reference to the accompanying drawings. FIG. 1 is a perspective view showing the overall construction of an automotive air conditioning system according to an embodiment of the invention, FIG. 2A is a plan view of a condensing unit portion, and FIG. 2B is a side sectional view of the same condensing unit portion. FIG. 3 is a perspective view of a unit cover for the condensing unit portion, and FIG. 4 is a perspective view of a unit case for the condensing unit portion.

The automotive air conditioning system is placed on a flat roof of a vehicle such as a bus and is constituted by a condensing unit portion 10 and a cooling unit portion 20. A condenser and a condenser fan, which will be described later, are provided in the interior of the condensing unit portion 10, and an evaporator and a blower, which are not shown, are provided in the interior of the cooling unit portion 20. Both these units are disposed adjacent to each other in a longitudinal direction of the vehicle.

The condensing unit portion 10 is constituted mainly by a unit case 1 and a unit cover 5 which covers the unit case 1. As shown in FIG. 1, provided in the unit cover 5 are an air inlet 51 which is opened largely toward the front of the vehicle and four air outlets 52 which are opened toward above the vehicle. A net 54 is provided over the air inlet 51 in such a manner as to cover the opening thereof, and large foreign matters carried together with running air are captured by the net 54, so that the ingress of the foreign matters into a condenser room can be prevented. A grill 53 is attached to each of the four air outlets 52. Consequently, as viewed in a longitudinal direction of the vehicle, the unit cover 5 is constructed so as to be opened largely at the front and closed at the rear and on both sides thereof.

Mounted in the interior of the unit case 1 are a thin condenser 2, and four condenser fan motors 3 and condenser fans 4. Shrouds 13 are formed in the unit case 1 in such a manner as to surround the condenser fans 4, respectively. In addition, three frames 11 extending in the longitudinal direction of the vehicle are provided on the unit case 1 for mounting thereon the condensing unit portion 10 and the cooling unit portion 20, and the thin condenser 2 is mounted on the frames 11 in such a manner as to be inclined from the front toward the rear of the vehicle. The inclination angle preferably ranges substantially from 6 to 12 degrees when considering the relationship between the height of the system resulting when it is installed and the amount of air drawn into the condenser.

In addition, as to the type of the condenser 2, while there is no preference to a specific type, it is preferable, in general, to use a thin plate fin and tube type heat exchanger.

Additionally, four pairs of mounting materials 12 are provided in the unit case 1 in such a manner as to extend in the longitudinal direction of the vehicle. The condenser fans 4 are rotatably attached to rotational shafts of the condenser fan motors 3, respectively. The condenser fans 4 are disposed in such a manner as to correspond to the four air outlets 52 formed in the unit cover 5, respectively, and are placed directly above the condenser 2 horizontally relative to the flat roof of the vehicle.

Furthermore, the condensing unit portion 10 and the cooling unit portion 20 which are made integral with each other by means of the frames 11 are installed on and fixed to the roof of the vehicle by means of vehicle frames 14 interposed between the frames 11 and the roof. Namely, the frames 11 are attached to the vehicle frames 14, respectively. The length of the vehicle frame 14 is substantially the same as that of the frame 11 and has a notch 14a formed at a position in the vicinity of the rear of the condenser 2 (as viewed in the longitudinal direction of the vehicle) for discharging foreign matters therethrough. The notch 14a is formed by dividing the vehicle frame 14 into two portions and disposing the two portions so divided in such a manner as to form a gap (a notch) therebetween. Consequently, foreign matters collecting within the condenser room and upstream of a core of the condenser 2 can be discharged from the notch 14a in the vehicle frame 14.

In the condensing unit portion 10 constructed as has been described hereinfore, air drawn in from the air inlet 51 formed in the unit cover 5 at the front thereof passes through the condenser 2 and is blown out above the unit cover 5 from the four air outlets 52. In this case, the longitudinal dimension of the condensing unit portion 10 can be reduced by disposing the condenser fans 4 and the condenser fan motors 3 directly above the condenser 2. Namely, while the longitudinal dimension of the conventional condensing unit portion 10 was 180 cm, the longitudinal dimension of the condensing unit portion 10 according to the present invention can be reduced to 70 cm. In addition, a space can effectively be utilized by inclining the thin condenser 2 and disposing the condenser fan motors 3 directly thereabove, whereby the height of the condensing unit portion 10 can be kept low.

Additionally, a ram pressure produced while the vehicle is running can be effectively utilized by opening the front side of the unit cover 5 and inclining the condenser 2 relative to the longitudinal direction of the vehicle, whereby air drawn in by virtue of the ram pressure can be sent to the condenser 2 without allowing the air so drawn in to escape to the outside of the condensing unit portion 10, and hence the amount of air drawn into the condenser 2 can be increased. As this can reduce the discharge pressure of a compressor and increase the coefficient of performance (COP) of the compressor, the load power applied to an engine of the vehicle can be largely reduced.

Furthermore, as the net 54 is provided over the air inlet 51 of the condenser 2 and the notch 14a is formed in the vehicle frame 14, large foreign matters are captured by the net 54, whereas relatively small foreign matters that cannot be captured by the net 54 are discharged from the notch 14a by virtue of running air, whereby the reduction in the performance of the condenser 2 can be prevented.

In FIG. 5, (a) and (b) show a wind velocity distribution (m/s) and a total pressure distribution (Pa), respectively, in a case where the distal end of the bus is formed into an edge shape, whereas (c) and (d) show a wind velocity distribution (m/s) and a total pressure distribution (Pa), respectively, in a case where the distal end of the bus is rounded. Note that the measuring conditions were that the vehicle velocity was 29.5 km/h and the wind velocity was 8.2 m/s. As can be seen from FIG. 5, when the distal end of the bus is formed into the edge shape, a negative pressure area where turbulent flows are generated in the air flow extends over the roof of the bus from the distal end to a position in the vicinity of one third of the overall length L thereof. Then, the air flow becomes a laminar flow at around a position situated beyond the position coinciding with one third of the overall length L. In addition, in the negative pressure area where turbulent flows are generated, the wind velocity is in the order of 1 to 3 m/s, and therefore, the wind velocity is low and the ram pressure cannot be utilized effectively. Due to this, as a position La for the installation of the automotive air conditioning system on the flat roof of the bus, a position La is preferable which is situated rearward of a point coinciding with one third of the overall length L from the distal end of the roof or rearward of a point coinciding with two thirds of the overall length L.

In contrast to this, in a case where the distal end of the bus is rounded (5R), as shown by (c), (d) in FIG. 5, no turbulent flow is generated in the air flow along the full length L of the flat roof of the bus but only laminar flows exist. Due to this, there exists no negative pressure area on the roof, and the wind velocity on the roof is in the order of 9 to 10 m/s. Consequently, in this case, the automotive air conditioning system can be installed at any position La along the full length L of the roof of the bus.

In addition, in this invention, while the condenser fan motors 3 are turning, most of the running air drawn into the condenser room passes through the core of the condenser 2 to be blown out of the condenser fans 4, and only part thereof is blown out from the notch 14a in the vehicle frame 14, whereby there may be caused a risk that foreign matters, that have entered the condenser, are not discharged therefrom.

To cope with this problem, the present invention adopts a control means for the condenser fan motors 3, that will be described below, in order to discharged foreign matters collecting in the condenser in an effective fashion.

Figure 6:
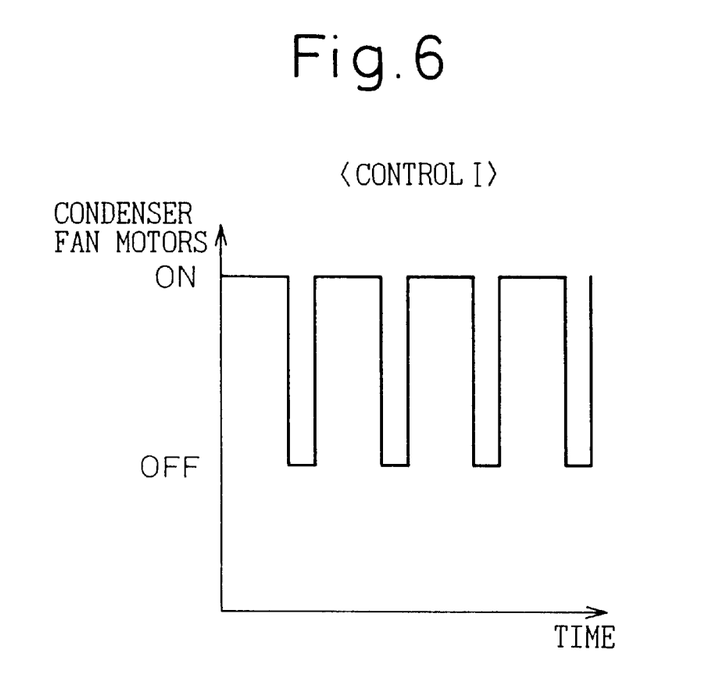
FIG. 6 is a graph explaining an example of a control (I) of the condenser fan motor of the automotive air conditioning system according to the present invention.

According to a control (I) of the condenser fan motors 3 according to an embodiment of the invention, a control apparatus (not shown) such as a timer is used as a control means and, as shown in FIG. 6, the condenser fan motors 3 are forcibly switched off after every certain time. Namely, the condenser fan motors 3 are switched on and off repeatedly at certain time intervals. With this construction, while the condenser fan motors 3 are being switched off, of the running air drawn into the condenser room, the air blown out from the condenser fans 4 is reduced, whereas the air blown out from the notch 14a is increased, whereby foreign matters collecting inside the condenser can be removed effectively from the notch 14a.

Figure 7:
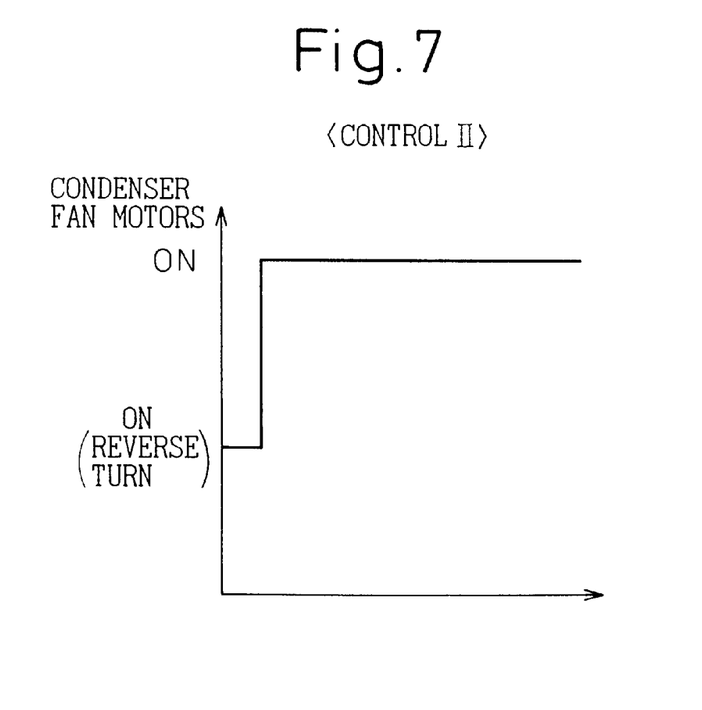
FIG. 7 is a graph explaining another example of a control (II) of the same condenser fan motor.

According to a control (II) of the condenser fan motors 3 according to another embodiment of the invention, a control apparatus (not shown) such as a timer is used as the control means and, as shown in FIG. 7, the condenser fan motors 3 are caused to turn in the reverse direction for a certain time after the air conditioning system has been activated, and thereafter, the condenser fan motors 3 are allowed to be driven to turn forward as normally. Thus, the air entering the condenser room from the air inlet 51 and air outlets 52 is caused to exit from the notch 14a by causing the condenser fan motors 3, and hence the condenser fans 4, to turn in the reverse direction for a certain time after the automotive air conditioning system has been activated, whereby foreign matters within the condenser can be discharged effectively from the notch 14a.

Figure 8:
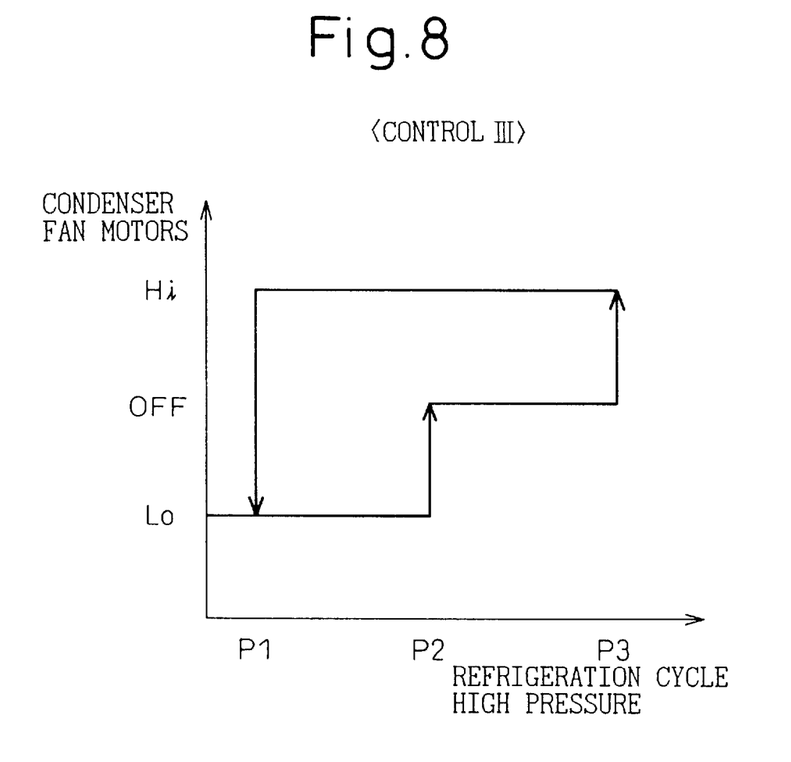
FIG. 8 is a graph explaining a further example of a control (III) of the same condenser fan motor.

Furthermore, according to a control (III) of the condenser fan motors 3 according to a further embodiment of the invention, there are provided a control apparatus (not shown) acting as the control means for controlling the drive of the condenser fan motors 3 and a pressure detecting means for detecting the discharge pressure of a compressor (not shown) of the air conditioning system and outputting pressure information so detected to the control apparatus, whereby, as shown in FIG. 8, the condenser fan motors 3 are controlled based on the discharge pressure of the compressor. In general, when foreign matters collect in the interior of the condenser or on the core thereof, the discharge pressure of the refrigeration cycle increases. Then, when the discharge pressure increases, the condenser fan motors 3 are switched off, so that foreign matters are discharged from the notch 14a effectively. To be specific, as shown in FIG. 8, assuming that there exists a relationship of a low discharge pressure P1|<| an intermediate discharge pressure P2|<| a high discharge pressure P3, when the discharge pressure is the low discharge pressure P1, the condenser fan motors 3 are driven at low speed (Lo), when foreign matters collect and the discharge pressure increases to reach the intermediate discharge pressure P2, the condenser fan motors 3 are switched off so that foreign matters are discharged from the notch 14a effectively, and when the discharge pressure increases further to reach the high discharge pressure P3, the condenser fan motors 3 are driven at high speed (Hi), and this series of operations is designed to be performed repeatedly.

Thus, relatively small foreign matters collecting within the condenser and upstream of the core of the condenser 2 can be discharged from the notch 14a in the vehicle frame 14 effectively by controlling the drive of the condenser fan motors 3 in the manner described above, whereby a reduction in the performance of the condenser can be prevented.

While the invention has been described by reference to the specific embodiments chosen for purposes of illustration, it should be apparent that numerous modifications could be made thereto by those skilled in the art without departing from the basic concept and scope of the invention.

What is claimed is:

1. An automotive air conditioning system comprising a cooling unit portion and a condensing unit portion that are placed on a flat roof of a vehicle such as a bus, wherein:
   a condenser of said condensing unit portion is inclined downwardly from the front toward the rear of said vehicle and a condenser fan is provided directly above said condenser, and wherein an air inlet to said condenser is disposed toward the front of said vehicle and an air outlet from said condenser is disposed above said condenser.

2. An automotive air conditioning system as set forth in claim 1, wherein said condenser fan is placed horizontally.

3. An automotive air conditioning system as set forth in claim 1, wherein a unit cover for covering said condenser and said condenser fan is opened at the front and is closed at the rear and on both sides thereof.

4. An automotive air conditioning system as set forth in claim 1, wherein a position, where said condensing unit portion is disposed, is situated at a portion of said roof of said vehicle such as a bus where the flow of air, flowing along said rood while said vehicle is running, becomes a laminar flow.

5. An automotive air conditioning system as set forth in claim 4, wherein said condensing unit portion is disposed rearward of the first two thirds of the overall length of said vehicle such as a bus in the event that a distal end of an upper portion of said vehicle is formed into an edge shape.

6. An automotive air conditioning system as set forth in claim 1, wherein the inclination angle of said condenser is substantially 6 to 12 degrees.

7. An automotive air conditioning system comprising a cooling unit portion and a condensing unit portion that are placed on a flat roof of a vehicle such as a bus, wherein:
   a condenser of said condensing unit portion is inclined in a longitudinal direction of said vehicle and a condenser fan is provided directly above said condenser, and wherein an air inlet to said condenser is disposed in front of said condenser and an air outlet from said condenser is disposed above said condenser, wherein:
   said air inlet to said condenser is covered with a net and said automotive air conditioning system is placed on said roof of said vehicle via a vehicle frame, and wherein a notch is formed in said vehicle frame in the vicinity of the rear of said condenser for discharging foreign matters to the outside of said vehicle frame.

8. An automotive air conditioning system as set forth in claim 7, further comprising control means for controlling the drive of a condenser fan motor for operating said condenser fan, wherein said condenser fan motor is forcibly switched off every time by said control means.

9. An automotive air conditioning system as set forth in claim 7, further comprising control means for controlling the drive of a condenser fan motor for operating said condenser fan, wherein said condenser fan motor is caused to turn in a reverse direction for a given time by said control means after said automotive air conditioning system has been activated.

10. An automotive air conditioning system as set forth in claim 7, further comprising control means for controlling the drive of a condenser fan motor, for operating said condenser fan, and pressure detecting means for detecting the discharge pressure of a compressor of said automotive air conditioning system, wherein the drive of said condenser fan motor is controlled according to the discharge pressure of said compressor.

* * * * *